Figure 1:
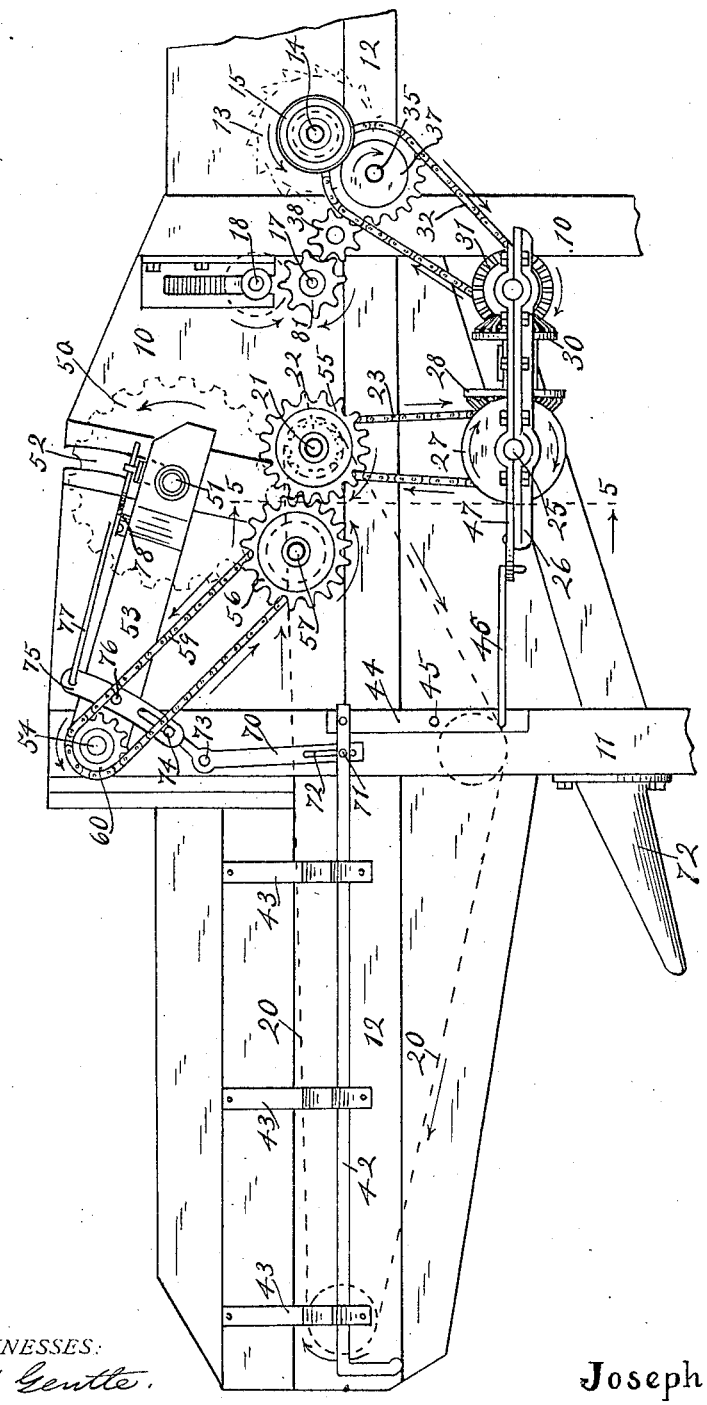

No. 852,271. PATENTED APR. 30, 1907.
J. R. HALL.
CORN HUSKER AND FODDER SHREDDER.
APPLICATION FILED JULY 20, 1905.

3 SHEETS—SHEET 1.

WITNESSES:
W. M. Gentle.
Helen B. McCord.

INVENTOR.
Joseph R. Hall.
BY
V. H. Lockwood
ATTORNEY.

THE NORRIS PETERS CO., WASHINGTON, D. C.

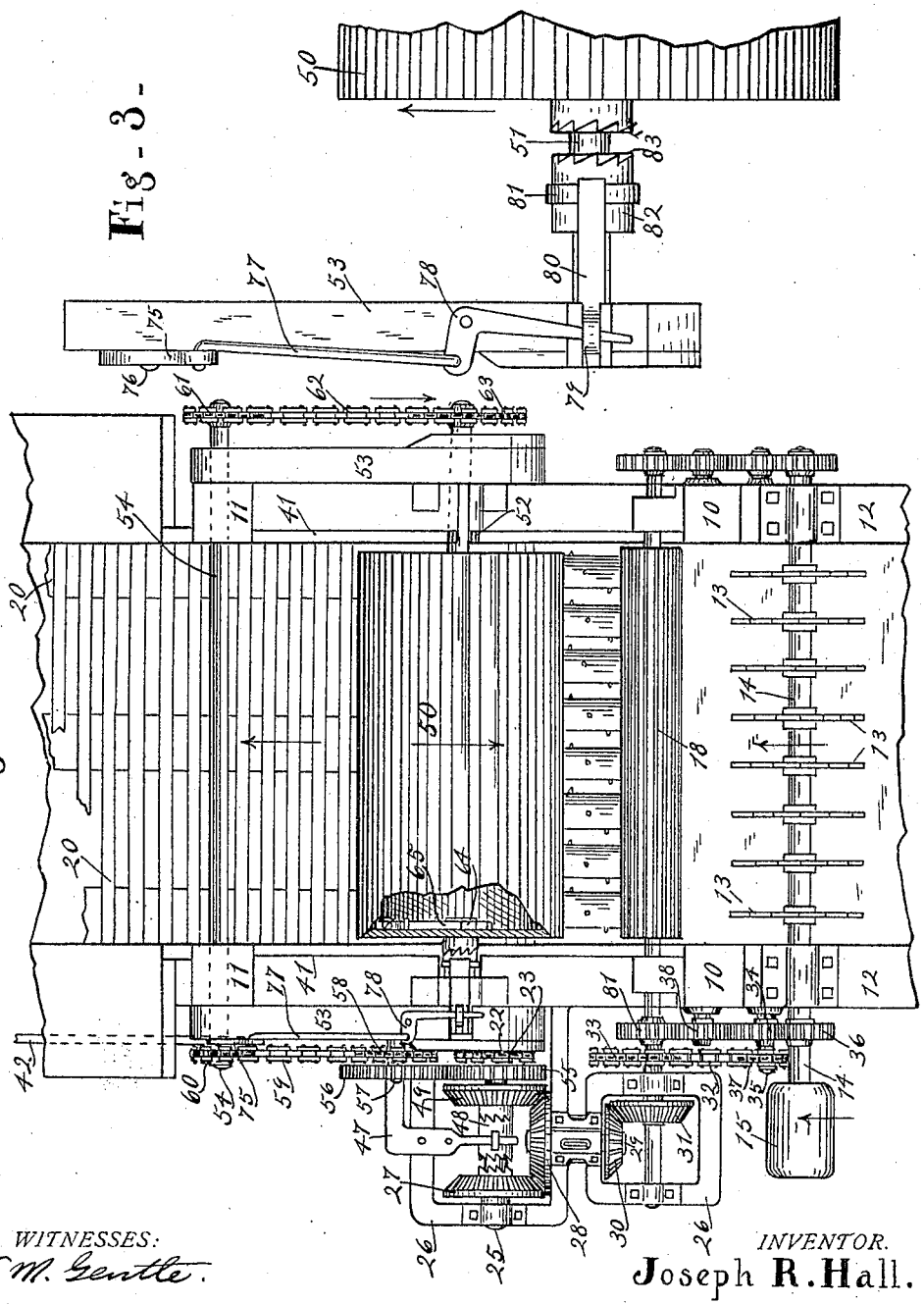

No. 852,271. PATENTED APR. 30, 1907.
J. R. HALL.
CORN HUSKER AND FODDER SHREDDER.
APPLICATION FILED JULY 20, 1905.
3 SHEETS—SHEET 3.
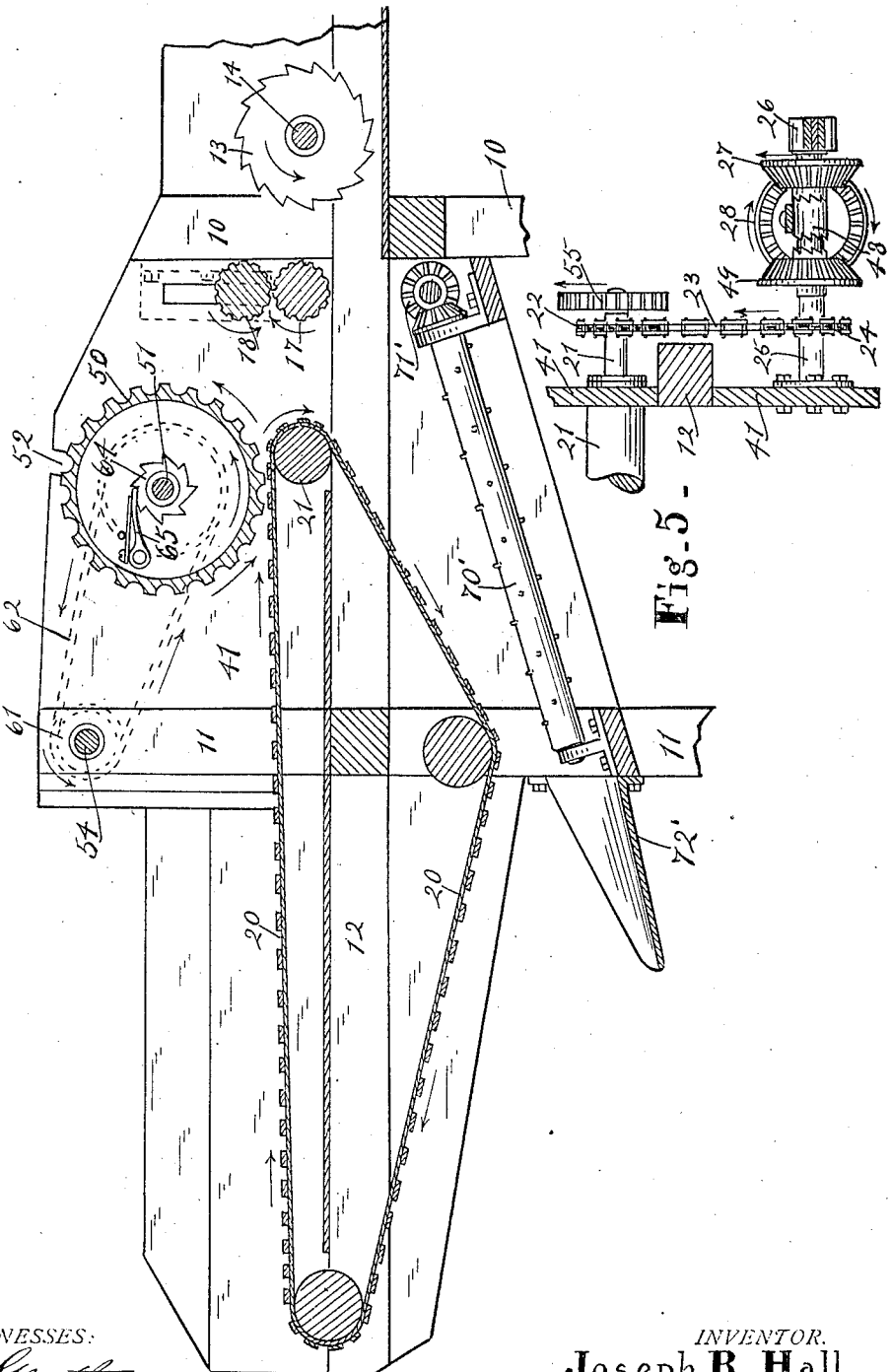
WITNESSES:
W. M. Gentle
Helen B. McCord
INVENTOR.
Joseph R. Hall.
BY
V. H. Lockwood,
ATTORNEY.

UNITED STATES PATENT OFFICE.

JOSEPH R. HALL, OF INDIANAPOLIS, INDIANA.

CORN-HUSKER AND FODDER-SHREDDER.

No. 852,271.      Specification of Letters Patent.      Patented April 30, 1907.

Application filed July 20, 1905. Serial No. 270,594.

*To all whom it may concern:*

Be it known that I, JOSEPH R. HALL, of Indianapolis, county of Marion, and State of Indiana, have invented a certain new and useful Corn-Husker and Fodder-Shredder; and I do hereby declare that the following is a full, clear, and exact description thereof, reference being had to the accompanying drawings, in which like letters refer to like parts.

This invention relates to improvements in corn huskers and fodder shredders over the machines shown in my previously obtained patents: No. 731,178, June 16, 1903; and No. 750,642, Jan. 26, 1904, granted to me, and No. 719,962, dated February 3, 1903, granted to John O. Thompson.

The chief feature of my invention consists in providing means for reversing the direction of movement of the conveyer and also for reversing the rotation of the feed roll, and such reversing means on the two parts of the device are thrown into operation simultaneously.

The full nature of the invention will be understood from the accompanying drawings and the following description and claims.

In the drawings Figure 1 is an elevation of the right-hand side of the machine, parts being broken away. Fig. 2 is a plan view of the right-hand portion of Fig. 1, showing the parts in their reversing operation, parts being broken away. Fig. 3 is a plan view of the means for reversing the feed roll, shown on a larger scale, and said means being in a disengaged position, with parts broken away. Fig. 4 is a central vertical section through the device with parts running in normal direction. Fig. 5 is a vertical transverse section through a portion of the device on the line 5—5 of Fig. 1.

Referring now to the details of the drawings shown herein merely for the purpose of illustrating the general nature of my invention, 10 and 11 represent uprights and 12 a longitudinal beam constituting parts of the frame of the machine. The cylinder blades 13 are mounted on the shaft 14 and 15 is a pulley driven from any suitable source of power. In front of the cylinder a pair of snap rolls 17 and 18 are mounted and suitable gearing provided, as shown, for driving them. There is nothing new in this part of the machine and, therefore, the details will not be described, as they are common and well understood.

The stalks are fed to the snap rolls by a conveyer 20, the upper portion of which is in line with the snap rolls. The conveyer is mounted upon suitable rollers, as has been common heretofore, the inner actuating one of which is marked 21. It is driven by a sprocket wheel 22, and chain 23 from the sprocket wheel 24 on a small shaft 25 mounted in the bracket 26 secured to the side of the machine. The shaft 25 is driven by a bevel gear 27 on said shaft that meshes with the bevel gear 28 on the shaft 29, which is driven in turn by the bevel gears 30 and 31. The latter shaft is driven by a sprocket wheel 33 and a chain 32 running from the sprocket wheel 33 on the shaft 35, which has a gear wheel 34 driven by the pinion 36 on the cylinder shaft 14. The lower snap roll has a pinion 81 on its outer end that is driven by a pinion 38 and the gear 34.

Beside the conveyer there are the usual feed tables and bottom forming a trough in front of which the operator stands for spreading the stalks on the conveyer, and there are side walls 41 beside the inner part of the conveyer for carrying the mechanism hereafter to be described. The conveyer is reversed by the operator withdrawing the bar 42 that is slidably mounted in brackets or guides 43 and is pivotally connected with the upper end of the lever 44 fulcrumed at 45. The lower end of the lever 44 is pivoted to a connecting rod 46 which in turn is pivotally connected with a bell-crank 47 that throws the clutch 48 into engagement with the clutch face at the side of the bevel gear 49 on the shaft 25 which, through means heretofore described, moves the conveyer.

There are two bevel gears 27 and 49 loosely mounted on said shaft, both of which are constantly driven by the bevel gear 28 and are alternately thrown into actuating engagement with the shaft by the double clutch 48 which is splined on the shaft and movable into engagement with either of the bevel gears 27 and 49, as desired, and by means of them the conveyer can be moved in either direction or thrown out of operation when the clutch is in a disengaged position midway between the bevel gears. The feed roll 50 is longitudinally corrugated and is mounted loosely on the shaft 51, the ends of which extend through vertically curved slots 52 in the side walls 41 and have bearings in the rearward ends of the bars 53. These bars at their forward ends are pivoted on the shaft 54 so that the rear ends of the bars are free to move up and down and to permit the feed roll to have such movement according to the quantity of stalks between it and the conveyer. This feed roll, therefore, rides by gravity upon the stalks. To co-operate with the conveyer in feeding the stalks into the snap rolls, said feed roll is driven in what may be called its forward or normal direction by the following means: A gear 55 on the roller shaft 21 meshes with the gear 56 on the spindle 57 mounted in the side wall of the machine, and that spindle has secured to it a sprocket wheel 58, and from it a chain 59 runs to the sprocket wheel 60 on the shaft 54. The mechanism just described is on the right-hand side of the machine and is shown in Fig. 1. The shaft 54 has a sprocket wheel 61 on the other side of the machine from which a chain 62 leads to a sprocket wheel 63 on the roll shaft 51, whereby said shaft is driven. On said shaft a ratchet wheel 64 is secured which is engaged by the pawl 65 on the end of the feed roll. The pawl and ratchet are shown within the feed roll.

The gearing of machines of this type is arranged so that the snap rolls will be driven at greater speed than the conveyer and feed roll, and they will tend to draw the stalks away from between the conveyer and the feed roll. This manner of driving the feed roll with a pawl and ratchet permits the feed roll to be turned forward idly somewhat, or at a more rapid speed temporarily than it is actuated by the means heretofore described, as the snap rolls more rapidly draw the stalks from under the feed roll. Without such pawl and ratchet drive, as for instance when the feed roll is rigidly mounted on its shaft, it is obvious that when the snap rolls draw the stalks at a rapid speed from under the feed roll, the feed roll will operate to retard the movement of the stalks and to oppose the action of the snap rolls. When, however, the snap rolls choke with stalks and it is desirable to withdraw them, or some of them, from the snap rolls, means is provided to reverse not only the conveyer, as has been described, but also the feed roll. This last reversing means is as follows: A lever 70 is pivotally connected by the pivot pin 71 in the bar 42 which pivot extends through a slot 72 in the bar 70. Said lever 70 is fulcrumed at 73 and has an arm extending through the slot 74 in the lever 75 that is fulcrumed at 76. A connecting rod 77 extends from the upper end of the lever 75 to the bell-crank lever 78, and the last lever extends through a strap 79 on the transversely slidable bar 80 that is secured to a yoke 81 that partially and loosely surrounds a clutch member 82 that is splined on the roller shaft 51 and so that the clutch member 82 may be moved into engagement with the clutch member 83 on the end of the roll. Consequently when these two clutch members are brought into engagement by the means just described, the roll will be actuated constantly in a reverse or backward direction, and such movement of the roll co-operating with a similar movement of the conveyer will unchoke the snap rolls. Then the stalks are distributed and the bar 42 pushed inward so that the mechanism will drive the conveyer and roll in their forward direction and the feeding of the machine will continue. This reversing enables the operator to unchoke the machine and distribute the stalks without placing his hands in dangerous positions.

So far as the reversing mechanism is concerned I do not wish to be limited to any particular sort of feed roll or means for actuating it.

What I claim as my invention and desire to secure by Letters Patent is:

1. In a corn-husker and fodder-shredder, the combination of snap rolls, a conveyer for feeding the stalks to the snap rolls, a feed roll mounted above the conveyer and adapted to engage the stalks between it and the conveyer, means for actuating the feed roll that permits it to be moved by the stalks more rapidly than by said actuating means, and means for simultaneously reversing both the conveyer and feed roll whereby the stalks may be withdrawn from the snap rolls.

2. In a corn husker and fodder shredder, the combination of snap rolls, a conveyer for feeding the stalks to the snap rolls, a feed roll mounted above and co-operating with the conveyer, a shaft upon which said feed roll is loosely mounted, means for actuating said shaft, a pawl and ratchet drive mechanism for transmitting power from said shaft to the feed roll whereby the feed roll may be rotated in a forward direction more rapidly than by said shaft and pawl and ratchet, and means for driving said feed roll and the conveyer simultaneously in a reverse direction.

In witness whereof, I have hereunto affixed my signature in the presence of the witnesses herein named.

JOSEPH R. HALL.

Witnesses:
C. HOAR,
N. ALLEMONG.